(12) United States Patent
Shiota et al.

(10) Patent No.: US 8,642,984 B2
(45) Date of Patent: Feb. 4, 2014

(54) ELECTROMAGNETIC WAVE EMISSION DEVICE

(71) Applicant: Advantest Corporation, Tokyo (JP)

(72) Inventors: Kazunori Shiota, Miyagi (JP); Akiyoshi Irisawa, Miyagi (JP)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 13/862,560

(22) Filed: Apr. 15, 2013

(65) Prior Publication Data

US 2013/0284950 A1 Oct. 31, 2013

(30) Foreign Application Priority Data

Apr. 27, 2012 (JP) ................ 2012-102797

(51) Int. Cl.
*G02F 1/39* (2006.01)
*G02F 1/00* (2006.01)
(52) U.S. Cl.
USPC ....... 250/504 R; 250/351; 359/326; 359/328; 359/332
(58) Field of Classification Search
USPC .............. 250/351, 504 R; 359/326, 328, 332
See application file for complete search history.

(56) References Cited

U.S. PATENT DOCUMENTS

| | | | |
|---|---|---|---|
| 8,210,035 B2* | 7/2012 | Imamura et al. | 73/114.75 |
| 8,253,103 B2* | 8/2012 | Ogawa et al. | 250/336.1 |
| 8,294,121 B2* | 10/2012 | Naitoh | 250/453.11 |
| 8,305,679 B2* | 11/2012 | Kondo et al. | 359/326 |
| 2012/0049072 A1* | 3/2012 | Kajiki et al. | 250/351 |
| 2012/0212375 A1* | 8/2012 | Depree, IV | 343/700 MS |
| 2012/0286797 A1* | 11/2012 | Kato et al. | 324/537 |
| 2013/0026368 A1* | 1/2013 | Herzinger | 250/341.3 |
| 2013/0068971 A1* | 3/2013 | Shiota | 250/504 R |
| 2013/0075597 A1* | 3/2013 | Shiota et al. | 250/227.11 |
| 2013/0181146 A1* | 7/2013 | Shiota et al. | 250/504 R |

FOREIGN PATENT DOCUMENTS

JP 2010-204488 9/2010

OTHER PUBLICATIONS

K. Suizu et al., "Extremely frequency-widened terahertz wave generation using Cherenkov-type radiation", Optics Express, vol. 17, No. 8, Apr. 2009, pp. 6676-6681.
U.S. Appl. No. 13/818,123 to Kazunori Shiota et al., which was filed Feb. 21, 2013.

* cited by examiner

*Primary Examiner* — David A Vanore
(74) *Attorney, Agent, or Firm* — Greenblum & Bernstein, P.L.C.

(57) ABSTRACT

According to the present invention, an electromagnetic wave emission device includes a nonlinear crystal having an optical waveguide; and a prism including an electromagnetic wave input surface and an electromagnetic wave transmission surface. The electromagnetic wave transmission surface includes a rotation surface which is a trajectory of a tilted line segment rotated about a central axis of the electromagnetic wave input surface, the tilted line segment being tilted with respect to the central axis. The tilted line segment and the central axis are on the same plane. The central axis is in parallel to an extending direction of the optical waveguide. The central axis passes through a projection of the optical waveguide into the electromagnetic wave input surface.

6 Claims, 17 Drawing Sheets

Comparative Example
(a case in which Triangular Prism 116 is used)

Comparative Example
(a case in which Triangular Prism 116 is used)

Comparative Example
(a case in which Triangular Prism 116 is used)

ELECTROMAGNETIC WAVE EMISSION DEVICE

BACKGROUND ART

1. Technical Field of the Invention

The present invention relates to an emission of electromagnetic waves (frequency thereof is between 0.01 [THz] and 100 [THz]) (such as terahertz waves (frequency thereof is between 0.03 [THz] and 10 [THz])), for example).

2. Related Art

A broadband terahertz wave generation method by means of a difference frequency terahertz wave generation using the Cerenkov radiation has been proposed (refer to FIG. 2 of Non-Patent Document 1 and FIG. 1 of Patent Document 1). Excitation light from a light source (KTP-OPO excited by Nd-YAG laser, for example) outputting two wavelengths is emitted to a nonlinear crystal (MgO-doped LN crystal, for example) according to FIG. 2 of Non-Patent Document 1. The incident excitation light having the two wavelengths induces nonlinear polarization in the MgO-doped LN crystal. If the MgO-doped LN crystal satisfies the condition ($n_{THz} > n_{opt}$) of the Cerenkov radiation, a spherical wave which takes the maximal value at each position corresponding to the twice of the coherence length is generated. This spherical wave has a wave front aligned in the direction of radiation angle $\theta$ satisfying the following relation, and the terahertz waves are emitted in this direction. It should be noted that $n_{opt}$ denotes a refractive index in the excitation light waveband of the MgO-doped LN crystal, and $n_{THz}$ is a refractive index in the terahertz waveband of the MgO-doped LN crystal.

$$\cos \theta = n_{opt}/n_{THz}$$

[Non-Patent Document 1] K. Suizu, K. Koketsu, T. Shibuya, T. Tsutsui, T. Akiba, and K. Kawase, "Extremely frequency-widened terahertz wave generation using Cherenkov-type radiation," Opt. Express 17(8), pages 6676-6681, 2009

[Patent Document 1] JP 2010-204488 A

SUMMARY OF THE INVENTION

An object of the present invention is to increase the output power of the terahertz waves.

According to the present invention, an electromagnetic wave emission device includes: a nonlinear crystal that receives excitation light having at least two wave length components, outputs an electromagnetic wave having a frequency between 0.01 [THz] and 100 [THz] through the Cherenkov phase matching, the nonlinear crystal having an optical waveguide; and a prism that includes an electromagnetic wave input surface which receives the electromagnetic wave from the optical waveguide and an electromagnetic wave transmission surface through which the electromagnetic wave that has entered the electromagnetic wave input surface transmits, wherein: the electromagnetic wave transmission surface includes a rotation surface which is a trajectory of a tilted line segment rotated about a central axis of the electromagnetic wave input surface, the tilted line segment being tilted with respect to the central axis; the tilted line segment and the central axis are on the same plane; the central axis is in parallel to an extending direction of the optical waveguide; and the central axis passes through a projection of the optical waveguide into the electromagnetic wave input surface.

According to the thus constructed electromagnetic wave emission device, a nonlinear crystal receives excitation light having at least two wave length components, outputs an electromagnetic wave having a frequency between 0.01 [THz] and 100 [THz] through the Cherenkov phase matching, the nonlinear crystal having an optical waveguide. A prism includes an electromagnetic wave input surface which receives the electromagnetic wave from the optical waveguide and an electromagnetic wave transmission surface through which the electromagnetic wave that has entered the electromagnetic wave input surface transmits. The electromagnetic wave transmission surface includes a rotation surface which is a trajectory of a tilted line segment rotated about a central axis of the electromagnetic wave input surface, the tilted line segment being tilted with respect to the central axis. The tilted line segment and the central axis are on the same plane. The central axis is in parallel to an extending direction of the optical waveguide. The central axis passes through a projection of the optical waveguide into the electromagnetic wave input surface.

According to the electromagnetic wave emission device of the present invention, a tilted angle of the tilted line segment with respect to the central axis may be determined so that the electromagnetic wave is refracted when transmitting through the electromagnetic wave transmission surface and travels in parallel to the central axis.

According to the electromagnetic wave emission device of the present invention, the rotation surface may be a trajectory of the tilted line segment rotated by 180 degrees about the central axis.

According to the electromagnetic wave emission device of the present invention, both ends of the tilted line segment may be on the line of travel of the electromagnetic wave traveling inside the prism from both ends of a portion of the central axis which receives the electromagnetic wave.

According to the electromagnetic wave emission device of the present invention, the optical waveguide may be a portion protruding from the nonlinear crystal.

According to the present invention, the electromagnetic wave emission device may include a buffer layer arranged between the prism and the nonlinear crystal, wherein the buffer layer is thicker than a penetration length of the excitation light and is thinner than the wavelength of the electromagnetic wave.

BRIEF DESCRIPTION OF DRAWINGS

FIG. 12 is a plan view of the electromagnetic wave emission device 1, and is a diagram showing a positional relation between the central axis C-C and the protruded portion 10a;

FIG. 16 is a plan view of the electromagnetic wave emission device 1 according to the third variation example of the present invention and is a diagram showing a positional relation between the central axis C-C and the protruded portion 10a.

MODES FOR CARRYING OUT THE INVENTION

A description will now be given of an embodiment of the present invention referring to drawings.

Figure 1:
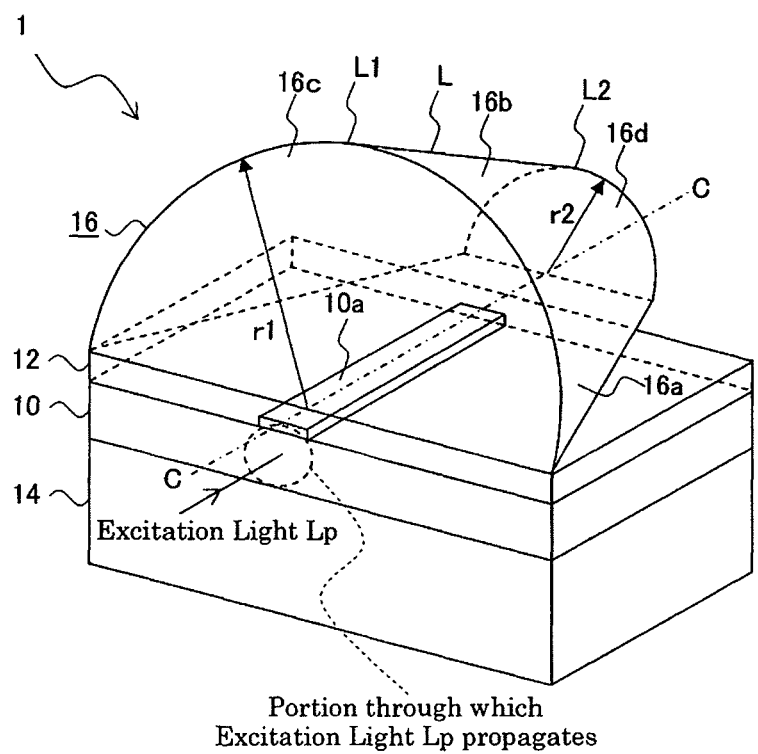
FIG. 1 is a perspective view of an electromagnetic wave emission device 1 according to an embodiment of the present invention.
Figure 2:
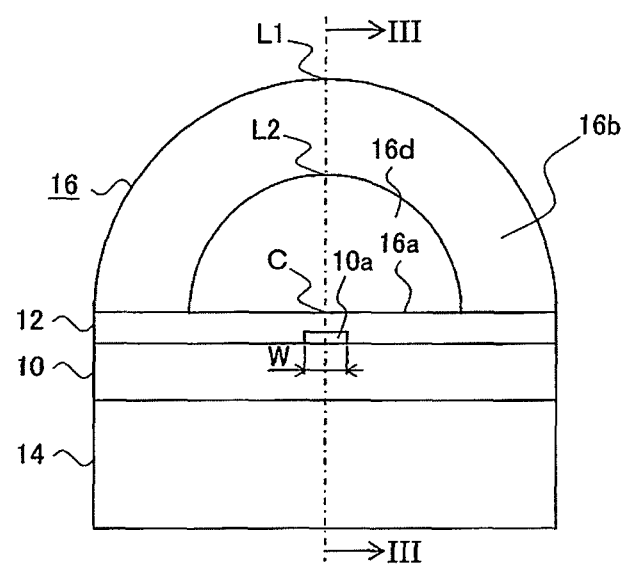
FIG. 2 is a front view of the electromagnetic wave emission device 1.
Figure 3:
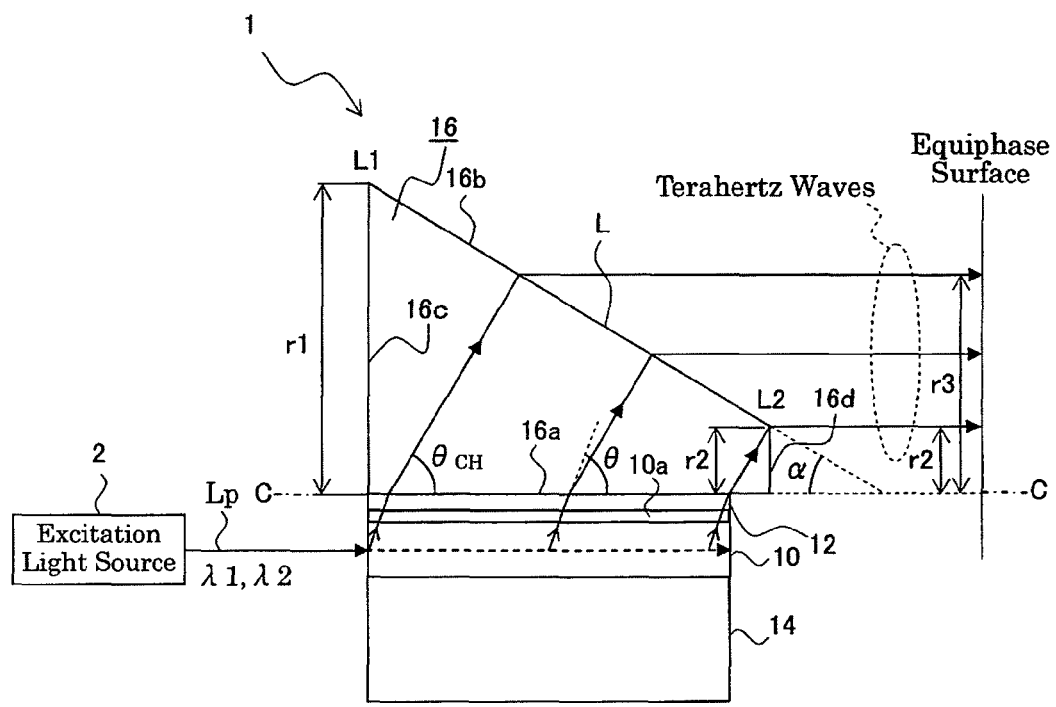
FIG. 3 is a cross sectional view of the electromagnetic wave emission device 1 taken along III-III line (refer to FIG. 2 for III-III line)
Figure 4:
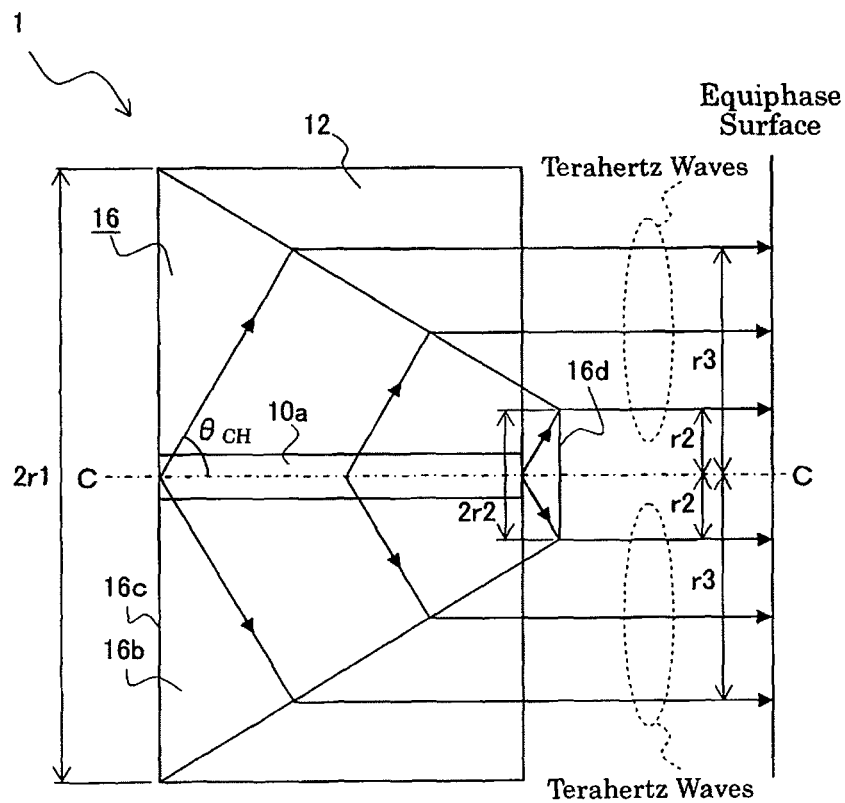
FIG. 4 is a plan view of the electromagnetic wave emission device 1 (it should be noted that the prism 16 is viewed therethrough)

FIG. 1 is a perspective view of an electromagnetic wave emission device 1 according to an embodiment of the present invention. FIG. 2 is a front view of the electromagnetic wave emission device 1. FIG. 3 is a cross sectional view of the electromagnetic wave emission device 1 taken along III-III line (refer to FIG. 2 for III-III line). FIG. 4 is a plan view of the electromagnetic wave emission device 1 (it should be noted that the prism 16 is viewed therethrough). The refraction of the terahertz waves when transmitting through an electromagnetic wave input surface 16a is omitted for the sake of illustration.

The electromagnetic wave emission device 1 emits electromagnetic waves having a frequency between 0.01 [THz] and 100 [THz]. The electromagnetic waves emitted from the electromagnetic wave emission device 1 are electromagnetic waves (terahertz waves) within the terahertz waveband (between 0.03 [THz] and 10 [THz]), for example. It is assumed that the electromagnetic waves emitted from the electromagnetic wave emission device 1 are terahertz waves in the following description of embodiments of the present invention.

The electromagnetic wave emission device 1 includes an excitation light source 2, a nonlinear crystal 10, a buffer layer 12, a substrate 14, and the prism 16.

Referring to FIG. 3, the excitation light source 2 outputs an excitation light Lp having two wavelength components (wavelengths $\lambda_1$ and $\lambda_2$). The wavelengths $\lambda_1$ and $\lambda_2$ take values within a range between 1250 nm and 1700 nm, for example. The excitation light Lp is a femtosecond optical pulse, for example. The femtosecond optical pulse includes wavelength components other than the two wavelength components (wavelengths $\lambda_1$ and $\lambda_2$), resulting in having two or more wavelength components.

The nonlinear crystal 10 is an MgO-doped LN crystal, for example. The nonlinear crystal 10 has a protruded portion 10a on its surface. The protruded portion 10a is an optical waveguide in a ridge shape as shown in FIG. 1. However, the shape of the optical waveguide is not limited to the ridge shape, a titanium diffused waveguide, a proton-exchanged waveguide, or the like may be provided in the nonlinear crystal 10, instead of the optical waveguide (protruded portion 10a). The excitation light Lp is emitted perpendicularly to a side surface (namely, YZ plane) of the nonlinear crystal 10. In other words, the side surface of the nonlinear crystal 10 receives the excitation light Lp. It is necessary to increase the power density of the excitation light Lp in order to realize a high output of the terahertz waves emitted by the electromagnetic wave emission device 1. Then, the protruded portion 10a is used to prevent extension of a portion through which the excitation light Lp propagates in the width direction of the nonlinear crystal 10 (referring to FIG. 2, the same direction as the width W of the protruded portion 10a), thereby decreasing the surface area for receiving the excitation light Lp (making the surface area which receives the excitation light Lp be smaller than the entire side surface area of the nonlinear crystal 10), and increasing the power density of the excitation light Lp. The width W (refer to FIG. 2) of the protruded portion 10a is quite small compared to the wavelength of the terahertz waves and is some μm to several tens of μm, for example.

It should be noted that a polarization plane of the excitation light Lp is parallel to Z axis (axis perpendicular to the paper of FIG. 3). The two wavelength components of the excitation light Lp form nonlinear polarization near the protruded portion 10a of the nonlinear crystal 10, and electromagnetic waves (terahertz waves) at the frequency corresponding to the polarization are emitted. It should be noted that if the effective refractive index of the nonlinear crystal 10 at the wavelength of the excitation light Lp is denoted by $n_{opt\_eff}$, and the refractive index of the nonlinear crystal 10 at the wavelength of the terahertz wave is $n_{THz}$, a relation $n_{THz} > n_{opt\_eff}$ holds true. The refractive indices for the two wavelengths ($\lambda_1$, $\lambda_2$) contained in the exiting light Lp are different from each other due to the refractive index dispersion of the nonlinear crystal 10. However, the difference of wavelength between $\lambda_1$ and $\lambda_2$ is quite small with respect to the wavelength of the terahertz waves, and thus the influence of the refractive index dispersion between $\lambda_1$ and $\lambda_2$ is almost negligible. Thus, the refractive indices ($n_1$, $n_2$) (respectively corresponding to $\lambda_1$, $\lambda_2$) of the excitation light Lp (wavelengths $\lambda_1$, $\lambda_2$) in the nonlinear crystal 10 are almost equal to each other and can be considered as $n_{opt\_eff}$.

If an angle satisfying the Cerenkov phase matching is $\theta$, the relation $\cos\theta = (\lambda_{THz}/n_{THz})/(\lambda_1\lambda_2/(n_1\lambda_2 - n_2\lambda_1))$ holds true. Here, the wavelength of the terahertz waves is $\lambda_{THz}$.

The terahertz waves, which are spherical waves, are Cerenkov phase-matched and are emitted from the neighborhood of the protruded portion 10a of the nonlinear crystal 10 in the direction at the angle $\theta$ satisfying the Cherenkov phase matching represented by the following equation (refer to FIG. 3). It should be noted that the angle $\theta$ is an angle between the travel direction of the excitation light Lp and the travel direction of the terahertz waves referring to FIG. 3. The following is an equation if it is assumed that $n_1 = n_2 = n_{opt\_eff}$ in $\cos\theta = (\lambda_{THz}/n_{THz})(\lambda_1\lambda_2/(n_1\lambda_2 - n_2\lambda_1))$.

$$\cos\theta \approx \frac{n_{opt\_eff}}{n_{THz}}$$

The nonlinear crystal 10 is mounted on the substrate 14. It should be noted that the substrate 14 is, via an adhesive, in contact with an opposite surface to the surface of the nonlinear crystal 10 on which the protruded portion 10a is arranged. The substrate 14 is a LN substrate, which is not doped, for example.

The buffer layer 12 covers the surface of the nonlinear crystal 10 on which the protruded portion 10a is provided and the protruded portion 10a. The refractive index of the excitation light Lp (wavelengths $\lambda_1$ and $\lambda_2$) in the buffer layer 12 is smaller than the effective refractive index of the excitation light Lp (wavelengths $\lambda_1$ and $\lambda_2$) in the protruded portion 10a of the nonlinear crystal 10. Moreover, the thickness of the buffer layer 12 is set to be thicker than the penetration length $\xi$ of the excitation light Lp, and to be thinner than the wavelength of $\lambda_{THz}$ of the terahertz waves to be extracted outside the electromagnetic wave emission device 1. As a result, even if the refractive index of the excitation light Lp in the prism 16 is larger than the effective refractive index of the excitation light Lp in the nonlinear crystal 10, it is possible to cause the terahertz waves to transmit through the buffer layer 12 while the excitation light Lp is confined in the neighborhood of the protruded portion 10a.

The prism 16 includes an electromagnetic wave input surface 16a, an electromagnetic wave transmission surface 16b, and bottom surfaces 16c and 16d. The electromagnetic wave input surface 16a is in contact with the buffer layer 12, and receives the terahertz waves from the neighborhood of the protruded portion 10a. The electromagnetic wave transmission surface 16b is a surface through which the terahertz waves, which have entered from the electromagnetic wave input surface 16a, transmit.

It is preferable for absorption of the terahertz waves to be small, in order to reduce a transmission loss of the terahertz waves in the prism 16. A material of the prism 16 may thus be high-resistivity silicon or germanium, for example. Moreover, it is preferable for the prism 16 to be transparent in the terahertz waveband and to be free from birefringence.

The prism 16 has a semicircular truncated cone shape about the central axis C-C on the electromagnetic wave input surface 16a. The bottom surface 16c and the bottom surface 16d are two bottom surfaces parallel to each other, and opposed to each other (refer to FIG. 3). It should be noted that the shape of the bottom surface 16c is a semicircle (radius thereof is referred to as r1) and the shape of the bottom surface 16d is a semicircle (radius thereof is referred to as r2 (<r1)). The bottom surface 16c and the bottom surface 16d are orthogonal to the magnetic wave input surface 16a.

Referring to FIG. 3, the tilted line segment L and the central axis C-C are on the same plane, and the tilted line segment L is tilted by an angle $\alpha$ with respect to the central axis C-C. The electromagnetic wave transmission surface 16b is a rotation surface which is a trajectory of the tilted line segment L rotated about the central axis C-C.

It should be noted that the electromagnetic wave transmission surface 16b can be considered as a rotation surface obtained by rotating the tilted line segment L about the central axis C-C by 90° counterclockwise and further rotating clockwise by 90° clockwise (namely, rotating the tilted line segment L about the central axis C-C by 180° (=90°+90°)) viewed from the bottom surface 16c.

It should be noted that it is preferable for the tilted angle $\alpha$ (refer to FIG. 3) to be defined so that the terahertz waves when transmitting through the electromagnetic wave transmission surface 16b are refracted, and travel in parallel to the central axis C-C. A description will now be given of how to define the tilted angle $\alpha$.

Referring to FIG. 3, the terahertz waves are emitted from the neighborhood of the protruded portion 10a and then transmit through the buffer layer 12. On this occasion, the angle between the travel direction of the terahertz waves and the travel direction of the excitation light Lp is $\theta$. After the transmission through the buffer layer 12, the terahertz waves are refracted when the terahertz waves transmit through the electromagnetic wave input surface 16a of the prism 16, and the angle between the travel direction of the terahertz waves and the travel direction of the excitation light Lp becomes $\theta_{CH}$ thereafter. It should be noted that $\theta_{CH}$ is represented by the following equation. It should also be noted that $n_{clad}$ is a refractive index of the prism 16 at the wavelength of the terahertz wave. Moreover, the relation $n_{clad} > n_{opt\_eff}$ holds true.

$$\cos\theta_{CH} \approx \frac{n_{opt\_eff}}{n_{clad}}$$

For example, if $n_{opt\_eff}$=2.173 and $n_{clad}$=3.415, then $\theta_{CH}$=50.5°.

Figure 13:
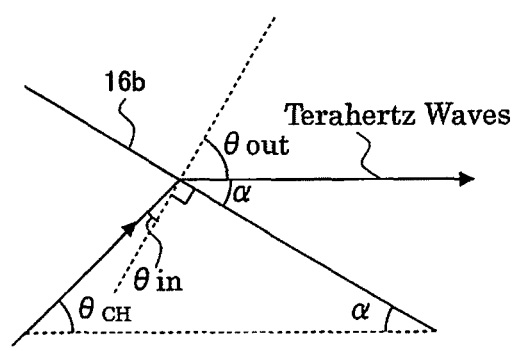
FIG. 13 is a diagram showing a relation among an incident angle $\theta_{in}$ of the terahertz waves into the electromagnetic wave transmission surface 16b, an emission angle $\theta_{out}$, and the tilted angle $\alpha$.

FIG. 13 is a diagram showing a relation among an incident angle $\theta_{in}$ of the terahertz waves into the electromagnetic wave transmission surface 16b, an emission angle $\theta_{out}$, and the tilted angle $\alpha$. Referring to FIG. 13, the following relations hold true for the incident angle $\theta_{in}$, the emission angle $\theta_{out}$, and the tilted angle $\alpha$.

$\theta_{in}$=90°−$\alpha$−$\theta_{CH}$ $\theta_{out}$=90°−$\alpha$

Moreover, according to the Snell's law, a relation:

$n_{clad} \sin\theta_{in} = \sin\theta_{out}$ holds true (here, it is assumed that the refractive index of the air around the electromagnetic wave emission device 1 is 1).

For example, $\alpha$=24° is obtained by assigning $\theta_{CH}$=50.5° and $n_{clad}$=3.415 to the equation described above.

Figure 12:
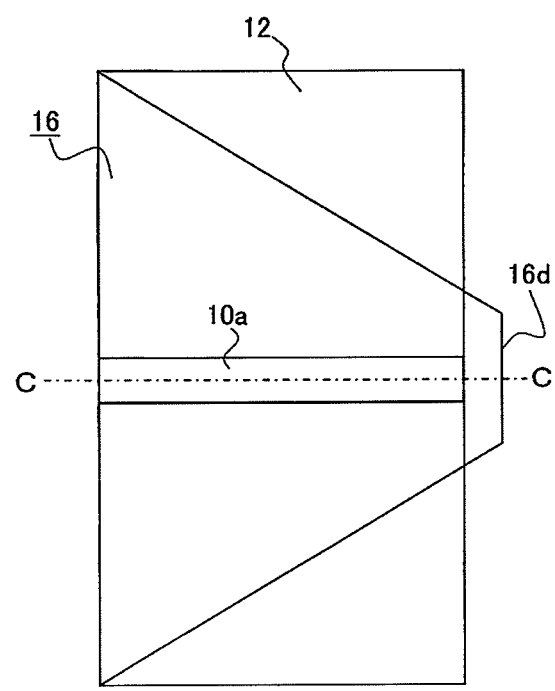

FIG. 12 is a plan view of the electromagnetic wave emission device 1, and is a diagram showing a positional relation between the central axis C-C and the protruded portion 10a. It should be noted that the prism 16 is viewed therethrough. The central axis C-C and a projection of the optical waveguide (protruded portion 10a) into the electromagnetic wave input surface 16a are shown in FIG. 12.

The protruded portion 10a does not reach a plane including the bottom surface 16d and only extends to a position in front of the plane. The central axis C-C is parallel to the extension direction of the protruded portion 10a. The central axis C-C passes through the projection of the protruded portion 10a into the electromagnetic wave input surface 16a. For example, the central axis C-C coincides with the symmetrical axis of the projection of the protruded portion 10a into the electromagnetic wave input surface 16a.

A description will now be given of an operation according to embodiments of the present invention.

The exiting light Lp is fed to the nonlinear crystal 10 from the excitation light source 2. The excitation light Lp travels approximately straight in the neighborhood of the protruded portion 10a. The two wavelength components (wavelengths λ$_1$ and λ$_2$) of the excitation light Lp form the nonlinear polarization in the neighborhood of the protruded portion 10a of the nonlinear crystal 10, and the terahertz waves at the frequency corresponding to the polarization are emitted. Moreover, the travel direction of the terahertz waves emitted from the neighborhood of the protruded portion 10a of the nonlinear crystal 10 satisfying the condition $n_{THz} > n_{opt\_eff}$ forms the angle θ satisfying the Cherenkov phase matching with respect to the travel direction of the excitation light Lp (refer to FIG. 3).

The terahertz waves emitted from the neighborhood of the protruded portion 10a transmit through the buffer layer 12. The angle between the travel direction of the terahertz waves and the travel direction of the excitation light Lp at this time is θ. After the transmission through the buffer layer 12, the terahertz waves are refracted when the terahertz waves transmit through the electromagnetic wave input surface 16a of the prism 16, and the angle between the travel direction of the terahertz waves and the travel direction of the excitation light Lp forms $θ_{CH}$ thereafter.

The terahertz waves which have traveled inside the prism 16 are refracted when transmitting through the electromagnetic wave transmission surface 16b, and travel in parallel to the central axis C-C. An equiphase surface parallel to the bottom surface 16c and the bottom surface 16d are irradiated with the terahertz waves which have traveled in parallel to the central axis C-C, for example.

Referring to FIG. 3, an area within the distance between r2 and r3 from the central axis on the equiphase surface is irradiated with the terahertz waves which have transmitted through the tilted line segment L. Moreover, referring to FIG. 4, the area within the distance between r2 and r3 from the central axis on the equiphase surface is also irradiated with the terahertz waves which have transmitted through a line where the electromagnetic wave input surface 16a and the electromagnetic wave transmission surface 16b intersect with each other.

Figure 5:
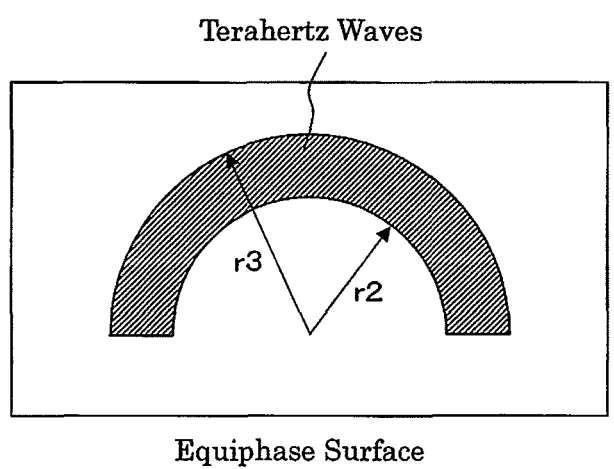
FIG. 5 is a diagram showing the area irradiated with the terahertz waves on the equiphase surface.

FIG. 5 is a diagram showing the area irradiated with the terahertz waves on the equiphase surface. It should be noted that the area irradiated with the terahertz waves are hatched in FIG. 5. The area irradiated with the terahertz waves has an approximately semicircular shape having an inner diameter r2 and an outer diameter r3.

On this occasion, a case (comparative example) in which a triangular prism 16 (refer to FIG. 5 of Patent Document 1, for example) is used instead of the prism 16 is compared to this embodiment. The comparative example corresponds to such a configuration that an optical waveguide in a ridge shape is provided in a nonlinear optical crystal according to Patent Document 1.

Figure 6:
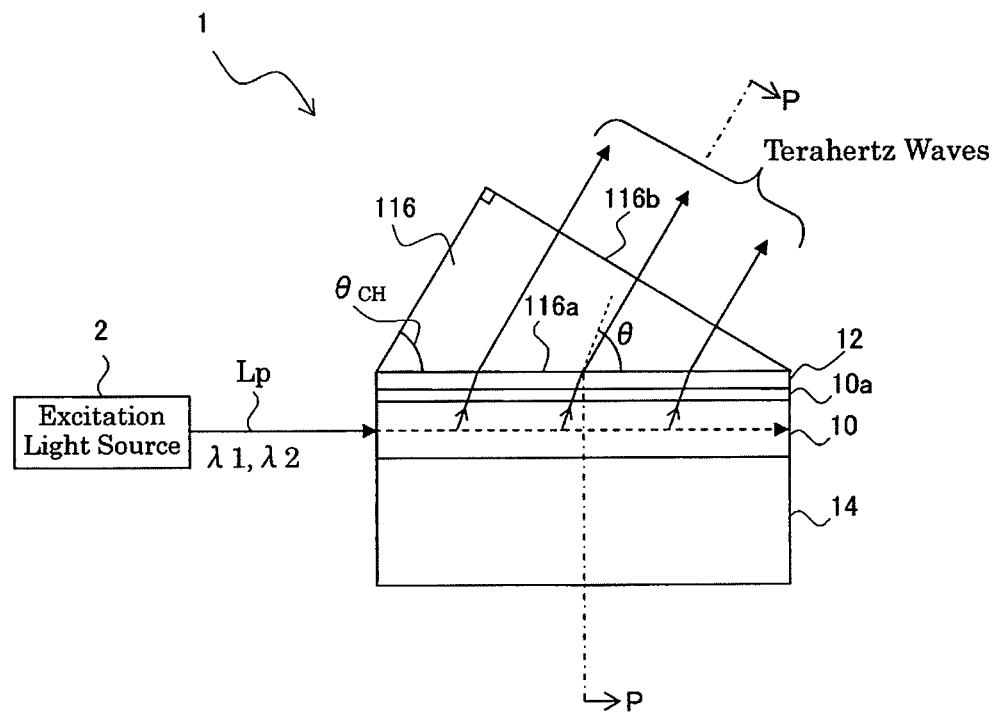
FIG. 6 is a side cross sectional view of the electromagnetic wave emission device 1 according to the comparative example.
Figure 7:
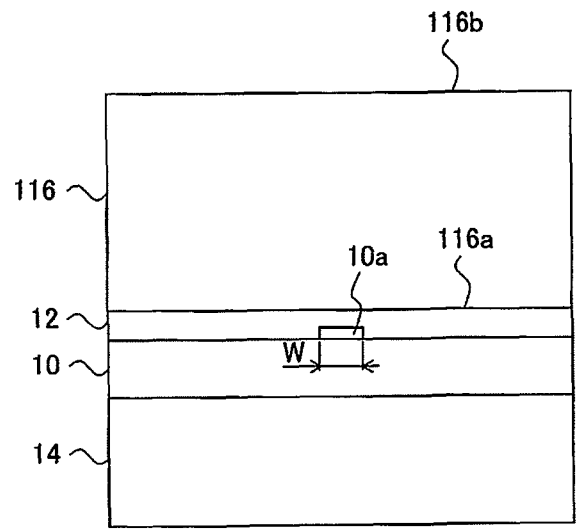
FIG. 7 is a front view of the electromagnetic wave emission device 1 according to the comparative example.
Figure 8:
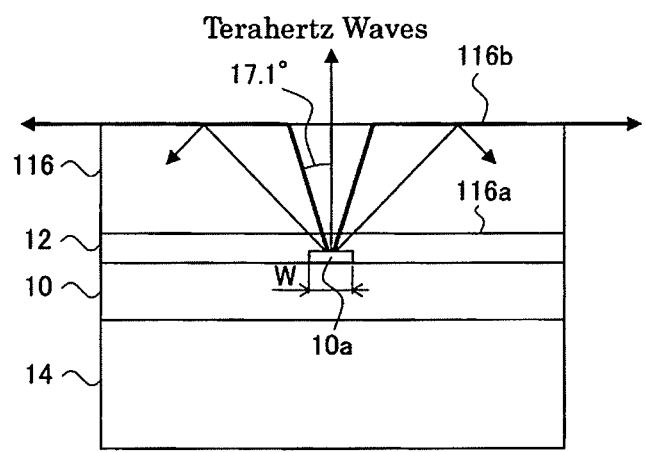
FIG. 8 is a cross sectional view of the electromagnetic emission device 1 according to the comparative example taken along P-P line (refer to FIG. 6 for P-P)

FIG. 6 is a side cross sectional view of the electromagnetic wave emission device 1 according to the comparative example. FIG. 7 is a front view of the electromagnetic wave emission device 1 according to the comparative example. FIG. 8 is a cross sectional view of the electromagnetic emission device 1 according to the comparative example taken along P-P line (refer to FIG. 6 for P-P).

It should be noted that the P-P plane is a plane parallel to a side surface of the nonlinear crystal 10 (namely YZ surface) in the buffer layer 12, the protruded portion 10a, the nonlinear crystal 10, and the substrate 14, and tilted with respect to a YZ plane by (90°−$θ_{ch}$) in the triangular prism 116.

The triangular prism 116 includes an electromagnetic wave input surface 116a (same as the electromagnetic wave input surface 16a) and an electromagnetic wave transmission surface 116b. The electromagnetic wave transmission surface 116b is tilted with respective to the electromagnetic wave input surface 116a. It should be noted that a direction of a normal line of the electromagnetic wave transmission surface 116b coincides with the travel direction of the terahertz waves.

An angle formed by the travel direction of the terahertz waves traveling in the triangular prism 116 and the travel direction of the excitation light Lp is $θ_{CH}$ both for the comparative example and this embodiment.

The terahertz waves are not refracted and travel straight when transmitting through the electromagnetic wave transmission surface 16b in FIG. 6. However, this occurs in the case where the terahertz waves travel toward a position immediately above the protruded portion 10a as shown in FIG. 8.

Referring to FIG. 8, the terahertz waves are diffracted in the direction of the width W of the protruded portion 10a in the comparative example. Thus, if the travel direction of the terahertz waves is displaced from the position immediately above the protruded portion 10a even by a slight angle, the terahertz waves are fully reflected by the electromagnetic wave transmission surface 116b. As a result, the output of the terahertz waves emitted by the electromagnetic wave emission device 1 is decreased. It should be noted that the slight angle is 17.1°, for example. Here, the refractive index of the terahertz wave in the triangular prism 116 is 3.4, and the refractive index of the terahertz wave in the air is 1.

According to embodiments of the present invention, the following effects can be obtained.

If nothing is arranged on the protruded portion 10a, the terahertz waves generated in the neighborhood of the protruded portion 10a are fully reflected at the interface between the protruded portion 10a and the air, and cannot be extracted outside the protruded portion 10a. Moreover, if the triangular prism 116 is arranged on the protruded portion 10a as in the comparative example, the terahertz waves which travel immediately above the protruded portion 10a can be extracted outside the protruded portion 10a. However, if the travel direction of the terahertz waves is displaced from the position immediately above the protruded portion 10a even by a slight angle, the terahertz waves are fully reflected by the electromagnetic wave transmission surface 116b.

Therefore, in the embodiments of the present invention, the prism 16 is arranged on the protruded portion 10a, and the electromagnetic wave transmission surface 16b of the prism 16 is configured to be the rotation surface obtained by rotating the tilted line segment L about the central axis C-C by 180°, and as a result, even if the travel direction of the terahertz wave is displaced from the position immediate above the protruded portion 10a, the terahertz wave transmits through the electromagnetic wave transmission surface 16b. As a result, the output power of the terahertz waves of the electromagnetic wave emission device 1 can be increased.

Moreover, the tilted angle α of the tilted line segment L is defined so that the terahertz waves are refracted when transmitting through the electromagnetic wave transmission surface 16b and travel in parallel to the central axis C-C, so that the collimated terahertz waves be extracted.

Although the prism 16 has been described as semicircular truncated cone, the shape of the prism 16 is not necessarily limited to the semicircular truncated cone.

For example, both ends L1 and L2 of the tilted line segment L may be on the lines of travel of the terahertz waves traveling in the prism 16 from both ends C1 and C2 of a portion of the central axis C-C which receives the terahertz waves out. A description will now be given of a variation in which the tilted line segment L is set as described above.

Figure 9:
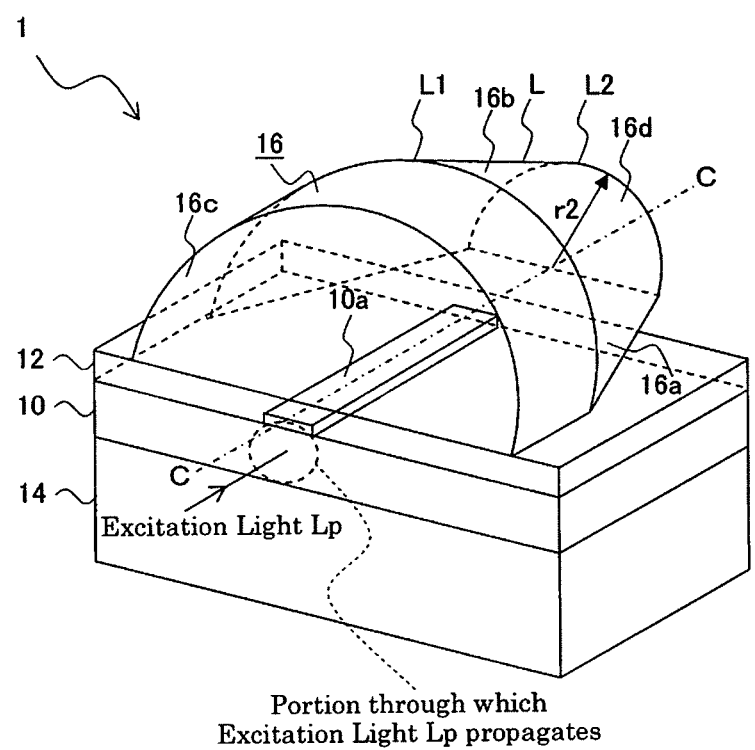
FIG. 9 is a perspective view of the electromagnetic wave emission device 1 according to a first variation example of the present invention.
Figure 10:
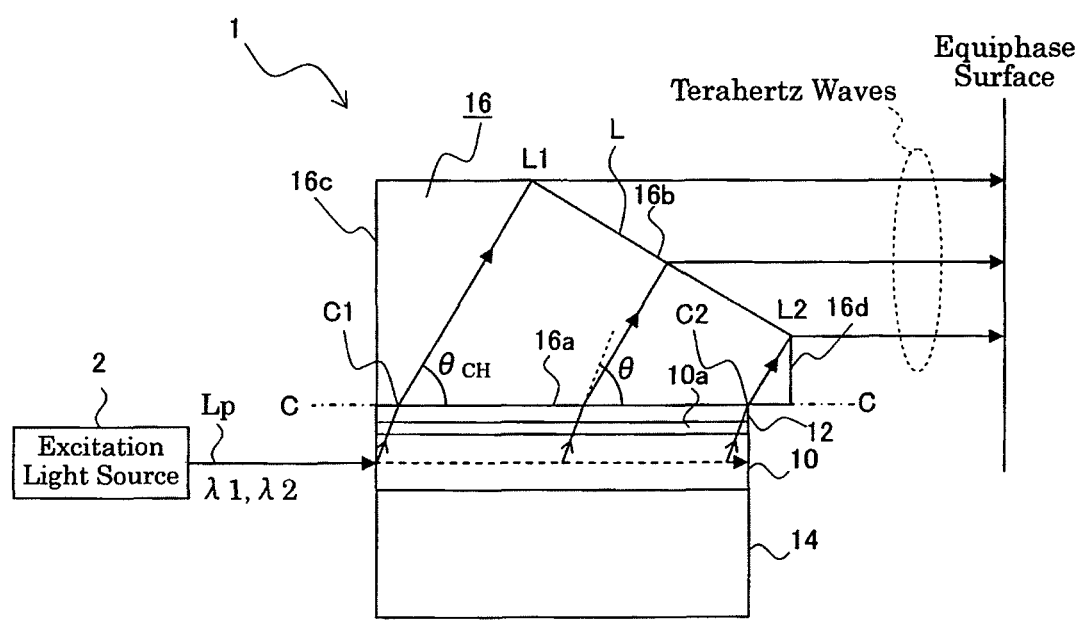
FIG. 10 is a side cross sectional view of the electromagnetic wave emission device 1 according to the first variation example of the present invention.

FIG. 9 is a perspective view of the electromagnetic wave emission device 1 according to a first variation example of the present invention. FIG. 10 is a side cross sectional view of the electromagnetic wave emission device 1 according to the first variation example of the present invention.

The prism 16 is a combination of a semicircular truncated cone and a semi-cylinder, in the first variation example of the present invention. Referring to FIG. 10, the end L1 of the tilted line segment L closer to the excitation light source 2 is on the line of travel of the terahertz wave traveling inside the prism 16 from the end C1 closer to the excitation light source 2 of the portion of the central axis C-C which receives the terahertz waves. The variation is different at this point from the above-described embodiment of the present invention (refer to FIG. 3) in which the end L1 of the tilted line segment L closer to the excitation light source 2 is immediately above C.

Referring to FIG. 10, the end L2 of the tilted line segment L farther from the excitation light source 2 is on the line of travel of the terahertz wave traveling inside the prism 16 from the end C2 farther from the excitation light source 2 of the portion of the central axis C-C which receives the terahertz waves. This point is the same as the above-described embodiment (refer to FIG. 3) of the present invention.

The electromagnetic wave transmission surface 16 includes the rotation surface (curved surface of a semicircular truncated cone) which is a trajectory of the tilted line segment L rotated about the central axis C-C, and a curved surface (curved surface of a semi-cylinder) which is a trajectory obtained by rotating, about the central axis C-C, a line which passes through the end L1 and is parallel to the central axis C-C.

The same effects as in the above-described embodiment of the present invention can be obtained also by the first variation example of the present invention. The shape of the electromagnetic wave transmission surface 16 closer to the excitation light source 2 than the end L1 is not necessarily limited to the curved surface of a semi-cylinder, but is arbitrary in the first variation example of the present invention.

Figure 11:
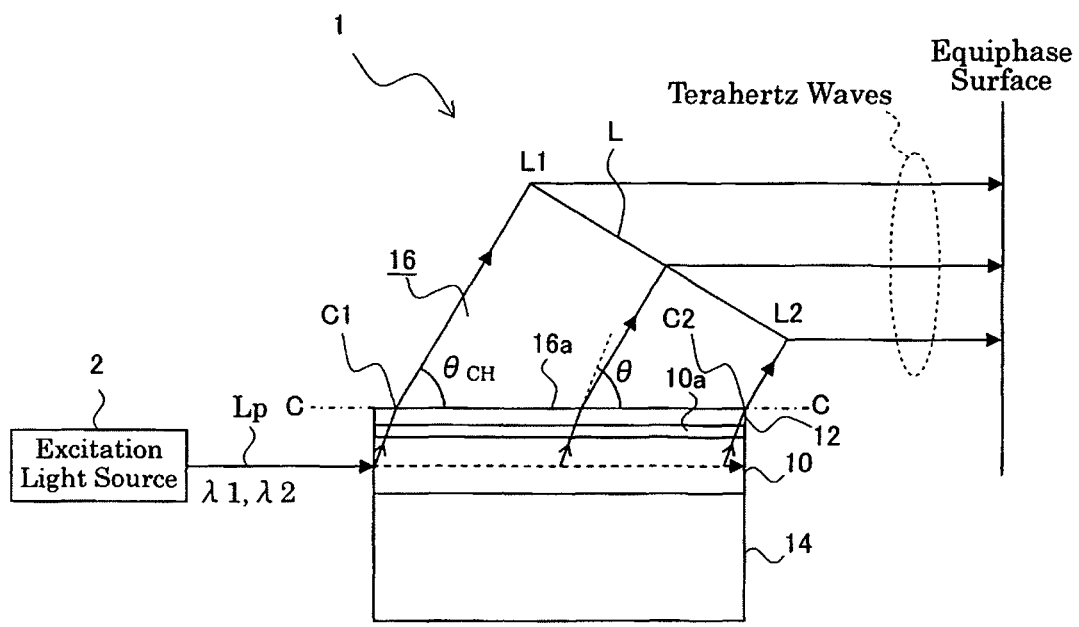
FIG. 11 is a side cross sectional view of the electromagnetic wave emission device 1 according to a second variation example of the present invention.

FIG. 11 is a side cross sectional view of the electromagnetic wave emission device 1 according to a second variation example of the present invention. The both ends L1 and L2 of the tilted line segment L are the same as those in the first variation example. However, the side cross section of the second variation example of the electromagnetic wave emission device 1 has a trapezoidal shape formed by a line C1L1, a line L1L2, a line L2C2, and a line C2C1. By rotating the trapezoid about the central axis C-C by 180°, the electromagnetic emission device 1 according to the second variation example is obtained.

The same effects as in the above-described embodiment of the present invention can be obtained also by the second variation example embodiment.

For example, the prism 16 may be half-cone, which is considered as a third variation example of the present invention.

Figure 14:
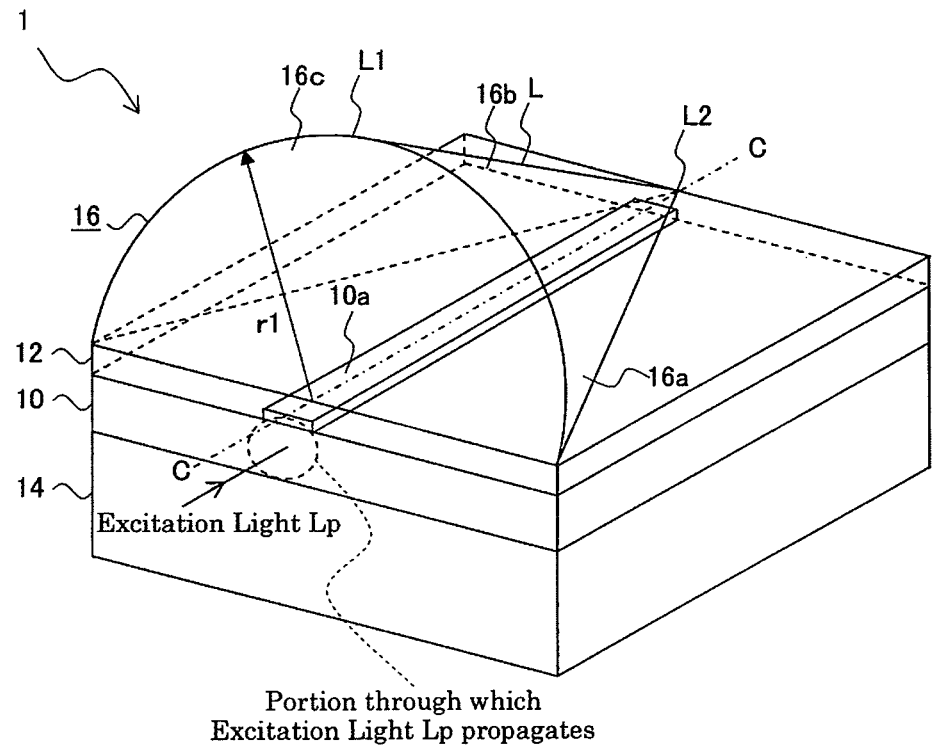
FIG. 14 is a perspective view of the electromagnetic wave emission device 1 according to the third variation example of the present invention.
Figure 15:
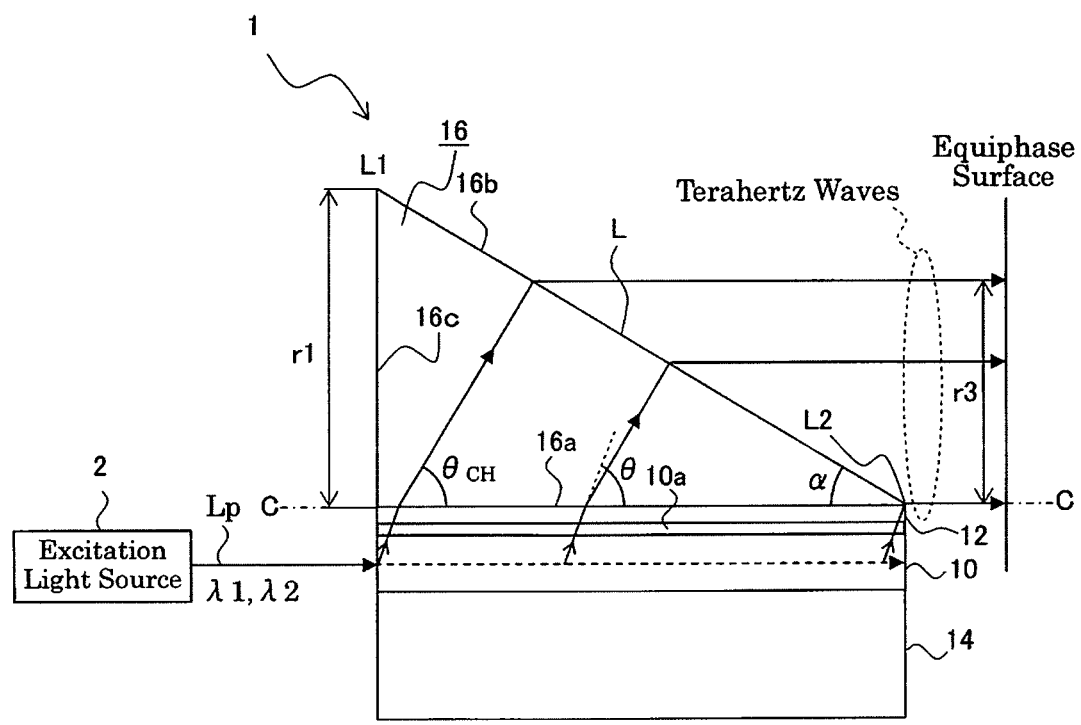
FIG. 15 is a side cross sectional view of the electromagnetic wave emission device 1 according to the third variation example of the present invention.

FIG. 14 is a perspective view of the electromagnetic wave emission device 1 according to the third variation example of the present invention. FIG. 15 is a side cross sectional view of the electromagnetic wave emission device 1 according to the third variation example of the present invention.

The electromagnetic wave emission device 1 according to the third variation example corresponds to a configuration in which the tilted angle is kept α=24° as in the above-described embodiment and r2=0.

Figure 16:
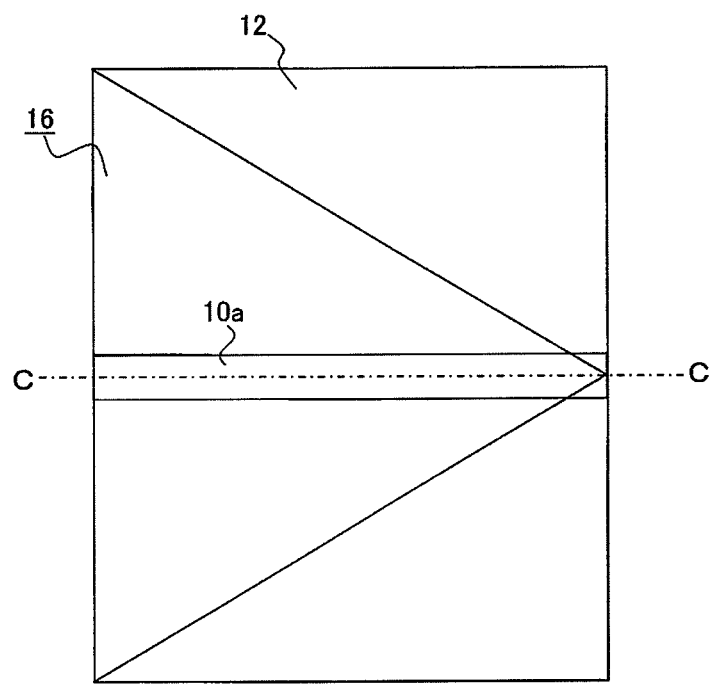

FIG. 16 is a plan view of the electromagnetic wave emission device 1 according to the third variation example of the present invention and is a diagram showing a positional relation between the central axis C-C and the protruded portion 10a. It should be noted that the prism 16 is viewed therethrough in FIG. 16. The central axis C-C and a projection of the optical waveguide (protruded portion 10a) into the electromagnetic wave input surface 16a are shown in FIG. 16. The positional relation between the central axis C-C and the protruded portion 10a are the same as that in the embodiment.

Figure 17:
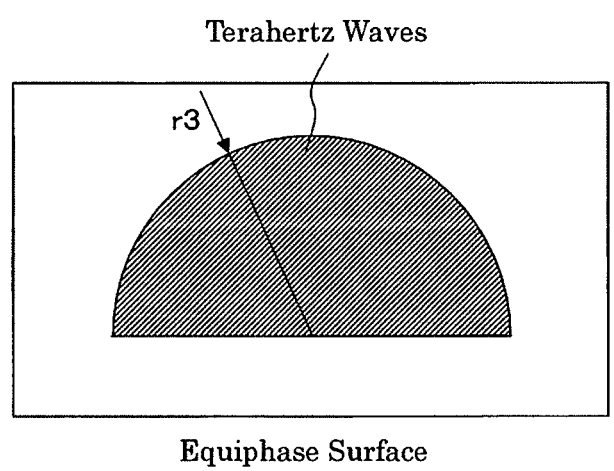
FIG. 17 is a diagram showing an area irradiated with the terahertz waves on the equiphase surface in the electromagnetic wave emission device 1 according to the third variation example of the present invention.

FIG. 17 is a diagram showing an area irradiated with the terahertz waves on the equiphase surface in the electromagnetic wave emission device 1 according to the third variation example of the present invention. The area irradiated with the terahertz waves according to the third variation example corresponds to a semicircle (with a radius r3) obtained when r2=0 in the area shown in FIG. 5.

The invention claimed is:

1. An electromagnetic wave emission device comprising:
   a nonlinear crystal that receives excitation light having at least two wave length components, outputs an electromagnetic wave having a frequency between 0.01 [THz] and 100 [THz] through the Cherenkov phase matching, the nonlinear crystal having an optical waveguide; and
   a prism that includes an electromagnetic wave input surface which receives the electromagnetic wave from the optical waveguide and an electromagnetic wave transmission surface through which the electromagnetic wave that has entered the electromagnetic wave input surface transmits, wherein:
   the electromagnetic wave transmission surface includes a rotation surface which is a trajectory of a tilted line segment rotated about a central axis of the electromagnetic wave input surface, the tilted line segment being tilted with respect to the central axis;
   the tilted line segment and the central axis are on the same plane;
   the central axis is in parallel to an extending direction of the optical waveguide; and
   the central axis passes through a projection of the optical waveguide into the electromagnetic wave input surface.

2. The electromagnetic wave emission device according to claim 1, wherein a tilted angle of the tilted line segment with respect to the central axis is determined so that the electromagnetic wave is refracted when transmitting through the electromagnetic wave transmission surface and travels in parallel to the central axis.

3. The electromagnetic wave emission device according to claim 1, wherein the rotation surface is a trajectory of the tilted line segment rotated by 180 degrees about the central axis.

4. The electromagnetic wave emission device according to claim 1, wherein both ends of the tilted line segment are on the line of travel of the electromagnetic wave traveling inside the prism from both ends of a portion of the central axis which receives the electromagnetic wave.

5. The electromagnetic wave emission device according to claim 1, wherein the optical waveguide is a portion protruding from the nonlinear crystal.

6. The electromagnetic wave emission device according to claim 1, comprising a buffer layer arranged between the prism and the nonlinear crystal, wherein the buffer layer is thicker than a penetration length of the excitation light and is thinner than the wavelength of the electromagnetic wave.

* * * * *